United States Patent [19]
Ziegler

[11] 3,744,637
[45] July 10, 1973

[54] BAFFLE WASTE TREATMENT TANK

[76] Inventor: Leon M. Ziegler, No. 3 McNulty Drive, Manchester, Mo. 63011

[22] Filed: Mar. 17, 1971

[21] Appl. No.: 125,278

[52] U.S. Cl.................. 210/195, 210/221, 210/525
[51] Int. Cl............................................. C02c 1/12
[58] Field of Search.................... 210/7, 8, 13–15, 210/60, 194, 196, 197, 205, 207, 208, 220, 221, 248, 195, 525

[56] References Cited
UNITED STATES PATENTS

| | | | |
|---|---|---|---|
| 3,028,011 | 4/1962 | McGivern | 210/220 |
| 3,202,285 | 8/1965 | Williams | 210/13 X |
| 3,385,444 | 5/1968 | Dufournet | 210/7 X |
| 3,400,822 | 9/1968 | McKeown | 210/220 X |
| 3,051,315 | 8/1962 | Boester | 210/15 X |
| 2,653,907 | 9/1953 | Griffith | 210/194 |
| 3,627,135 | 12/1971 | Goodman | 210/221 X |

*Primary Examiner*—Samih N. Zaharna
*Assistant Examiner*—Thomas G. Wyse
*Attorney*—Polster & Polster

[57] ABSTRACT

A waste treatment tank has a single baffle dividing an enclosure into a lower aeration compartment and an upper clarification compartment. A blower supplies air to both an aeration air system and a floating waste recycle system. The baffle has openings along its top and bottom permitting controlled communication between aeration and clarification compartments. The aeration air system operates so as to create a circulatory effect in the aeration compartment causing raw sewage to circulate upwardly along a bottom surface of the baffle.

10 Claims, 2 Drawing Figures

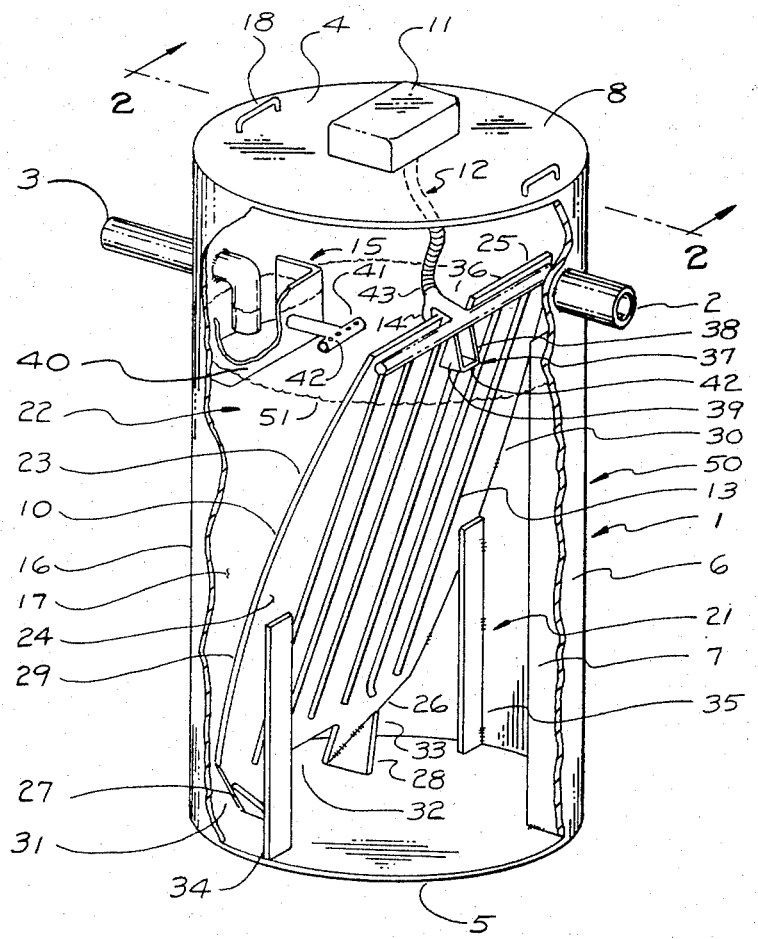
Fig-1-
INVENTOR
LEON M. ZIEGLER

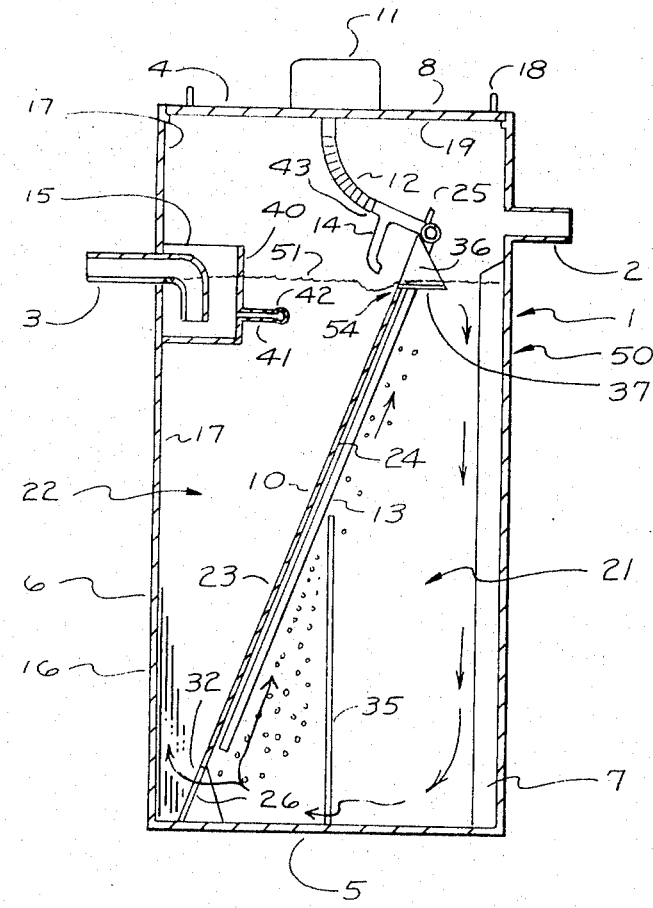
Fig-2-
INVENTOR
LEON M. ZIEGLER
BY
ATTORNEYS 3,744,637

BAFFLE WASTE TREATMENT TANK

BACKGROUND OF THE INVENTION

This invention relates to apparatus for treating waste products and in particular to a waste treatment tank construction adaptable to domestic use.

Aeration process treatment tanks are well known in the art and their basic operational processes are given in the U.S. Pat. to Weis, No. 3,161,590 and Kibbee, No. 3,195,727. In general, treatment tanks based on an aeration process have two tank sections, commonly referred to as aeration and clarification respectively. Raw sewage is introduced into the aeration tank where it is mixed with air forced into the tank by a blower. The air aids the multiplication of bacteria which convert the raw sewage into a decomposed mixture. As the sewage breaks apart, it is free to enter the clarification tank. There, the sewage can be mixed with additional chemicals which render it less offensive and permit its disposal.

Prior art treatment tanks define their aeration and clarification tank sections by baffle systems. It is common to have intercommunication between the sections. Consequently, it is not uncommon to have non-decomposed sewage solids enter the clarification tank section where they are responsible for several common tank failures. Non-decomposed sewage solids tend to settle or to rise in the clarification tank section. Solid sewage entering the clarification tank section with many air bubbles attached to it, or when the solids are buoyant, will rise, while heavier solids, or those with fewer attached bubbles, settle. Since communication between tank sections commonly is along the bottom wall of the tank, settling sewage solids can block the communication passage, rendering the tank inoperable. On the other hand, rising sewage solids can block the tank outlet, with inoperability again the result, or they can be discharged, which is undesirable.

Prior art tanks dealt with the settling sewage by developing elaborate baffle systems which tend to reintroduce settled solids into the aeration tank sections. Rising solids also are reintroduced in the aeration tank section by complicated feedback structures. The Weis and Kibbee patents are illustrative. While these prior art tanks accomplish their intended purposes, their complex baffles and feedback structures are oftentimes subject to the very solid sewage blockage they were intended to relieve. Even where they are not subject to blockage, their complicated construction means considerable product cost, which limits their acceptability in the marketplace, particularly in single family dwelling applications.

I have developed a novel tank structure utilizing a single baffle plate which, in conjunction with judiciously placed air induction means fed by a single air mover source eliminates the problems caused by solid sewage blockage in prior art tanks. Equally important, I have found that the direction of mixture circulation in the aeration compartment is a feature heretofore neglected in tank design.

SUMMARY OF THE INVENTION

In accordance with this invention, generally stated, a waste treatment tank has a baffle dividing it into an aeration and a clarification section. Intercommunication between sections is provided at both the top and the bottom of the baffle. Air flow is introduced into the tank at the bottom of the baffle in the aeration section and at the top of the baffle in the clarification section. Aeration section air flow creates a circulatory mixture flow upwardly along the lower wall surface of the baffle. Air introduced into the clarification section skims sewage solids from that section and forces solids into the aeration tank section. The preferred embodiment utilizes a single air mover source for both aeration and clarification section air flow.

BRIEF DESCRIPTION OF THE DRAWINGS

In the drawings,

FIG. 1 is a view in perspective, partly broken away, of the waste treatment tank of my invention; and FIG. 2 is a sectional view taken along the line 2—2 of FIG. 1.

DESCRIPTION OF THE PREFERRED EMBODIMENT

Referring now to FIG. 1, reference numeral 1 indicates an enclosure for a waste treatment tank 50. Enclosure 1 generally is cylindrical, having a curved side wall 6, a bottom wall 5 and a top wall 4.

Side wall 6 has an exterior surface 6 and an interior surface 17. Wall 6 has an inlet pipe 2 and an outlet pipe 3 from and through surfaces 16 and 17. Conventionally, inlet pipe 2 and outlet pipe 3 are positioned symmetrically and welded in place, usually with the lowermost part of outlet pipe 3 below the inlet height.

Top wall 4, in the preferred embodiment, is circular and removably mounted to side wall 6 by any convenient method. A pair of tabs 18 are provided to aid in removal of top wall 4 when such removal is required, as, for example, for tank maintenance. Wall 4 has an outer surface 8 and an inner surface 19. Surface 8 supports air supply means 11 mounted on it. Air supply means 11 is conventional and may include a small motor driven compressor or other common air moving means. Air supply means 11 provides forced air to an aeration air duct 12 which is described in detail hereinafter.

Top wall 4 may have access plates or hinge mounted doors (not shown) through it. These access means permit visual inspection of tank portions and in particular provide access to a sluice box 15 without necessitating complete removal of top 4.

Sluice box 15 is a four sided, open topped rectangular structure fixed to surface 17 of wall 6. It surrounds a vertical leg of outlet pipe 3 and serves several purposes. Sluice 15 provides a controlled head pressure for outlet pipe 3. It also provides a station within tank 50 where additional chemicals may be added to further reduce the offensive nature of the treated sewage. For example, bagged chemicals may be suspended in sluice 15 when such additional treatment is desired. It should be noted that the tank of my invention also functions satisfactorily, in most applications, by relaying on an aeration process for sewage treatment, without the need of any additional chemical process. Sluice 15 is conventional. A front 40 has a drain 41 from and through it as is best seen in FIG. 2. Drain structures are old in the art and need be little more than common pipe attached to sluice 15 at any desired liquid bleed off height. As indicated above, however, rising sewage solids can block the tank outlet. To reduce the effect of rising sewage solids at the tank outlet, I have designed drain 41 in a T shape, although other designs may be utilized. Drain 41 has a plurality of openings 42 along the upper surface of the T cross member. Drain 41 is mounted to sluice 15 below a liquid discharge level 51. Discharge level 51 is defined as the liquid level in tank 50 wherein further sewage input necessarily causes liquid output at outlet 3. Because openings 42 are in the upper surface of drain 41, rising sewage solids flow past the opening height without blocking it and may be recycled, as is explained fully hereinafter. While the shape of drain 41 may vary, the placement of openings 42 along the upper surface of the drain and the physical location of the drain below liquid level 51 enables the tank herein disclosed to be subject to fewer outlet blockage problems than tanks heretofore known in the art.

A baffle 10 is positioned within tank 50 so as to divide that tank into approximately equal volumetric compartments delineated as an aeration section 21 and a clarification section 22. Because of the cylindrical shape of tank 50, baffle 10, in general form, is elliptical. Other tank designs may require different conforming baffle shapes. Baffle 10 has an upper surface 23, a lower surface 24, a top edge 25 and a bottom edge 26, and side edges 29 and 30. Bottom edge 26 is fixed to tank bottom 5 along two leg portions 27 and 28. Edge 26 is cut away from legs 27 and 28 to define a series of communicative openings 31, 32, and 33 between aeration section 21 and clarification section 22. Sides 29 and 30 abut surface 17 of wall 6 along the vertical rise of baffle 10 in a friction fit, and may be spot welded to surface 17 if desired.

Top edge 25 has a skimmer opening 36 in it, which receives a skimmer chute 37. The purpose of skimmer chute 37 is described in detail hereinafter. The depth of opening 36, and consequently the height of chute 37 is chosen so that communication between aeration section 21 and clarification section 22 exists under certain defined conditions. Chute 37 is triangular in side elevation, having spaced parallel walls 38 and 39 connected by a bottom wall 42. Chute 39 is mounted within opening 36 and attached to baffle 10 by any convenient method.

An air distribution system 12 is operatively connected to air supply means 11 by common air conduit means 43, through top 4. In the embodiment illustrated, air distribution system 12 includes a clarification waste removal air faucet 14 and a plurality of aeration discharge pipes 13. Faucet 14 and pipes 13 may be conventional piping. If desired, they additionally may be treated to resist corrosion.

Faucet 14 may take a variety of forms. A simple opening in air conduit means 43 at its connection with distributor system 12 works well. However, in the operation of my invention, it is important that faucet 14 direct a current of air from clarification section 22 to aeration section 21 through skimmer chute 37.

Aeration discharge pipes 13 extend along lower surface 24 of baffle 10 and are attached thereto. Pipes 13 and faucet 14 are supplied by a single air source 11 in the embodiment illustrated. Pipes 13 are open ended and are positioned to exhaust air near opening 32, between aeration section 21 and clarification section 22. The positioning of pipes 13, their functional operation with baffle 10 and the release of air near opening 32 are important aspects of my invention.

Aeration compartment 21 has a series of flow directors 34, 35 and 7 in it. Directors 34 and 35 are placed near baffle 10, and more particularly, near openings 31 and 33. Director 7 is positioned in the aeration compartment, approximately 90° from directors 34 and 35. Each director is substantially rectangular in plan. They are attached to side wall 6 along their material thickness by any convenient method. Directors 34, 35 and 7 primarily are intended to aid in directing liquid flow in tank 50. Each director performs a secondary function in the operation of the tank of this invention in that solid matter striking the directors tends to break apart.

Raw sewage enters tank 50 through inlet 2. The sewage is a mixture of water, waste solids and liquids. Solid matter entering the tank strikes director 7 which tends to break up large chunks in the sewage. Unbroken chunks in the sewage liquid tend to settle toward the bottom of tank 50 as they first enter the aeration compartment. Liquid level in the tank rises until it reaches discharge level 51. Decomposition of the sewage begins immediately as the aerated environment of aeration section 21 breeds bacteria.

Air supply 11 forces air through pipes 13 where it is released near opening 32. Air release at this particular position within tank 50 is important. First, the release of air near opening 32 causes the liquid about openings 31, 32 and 33 to become very turbulent as compared to the liquid near the top of tank 50. Turbulence at the openings prevents accumulation of any settling solids bout those openings. Second, air release at the location shown causes air bubbles to rise to the top of tank 50 along lower surface 24 of baffle 10. This air release creates a circulatory flow in the aeration compartment in the direction indicated in FIG. 2 which keeps sewage particles in the aeration section in continual motion and exposed to an oxygen source until they decompose in the aerobic process of the tank. As the liquid flows across level 51 in the pattern indicated by the arrows in FIG. 2, it flows against side wall 6 and is directed downwardly thereby towards bottom 5 of tank 50. The downward direction of the flow repeatedly exposes larger sewage solids to director 7 until they are reduced to acceptable size. Director 7 also functions to stabilize flow direction. That is, director 7 prevents the development of any circulatory horizontal plane liquid movement. The flow passes along bottom 5 and is channeled toward opening 32 by directors 34 and 35, away from openings 31 and 33. After passing the directors, the main stream divides. A portion of the stream is drawn upwardly along surface 24 of baffle 10 by the rising air flow. This portion of the stream joins the continually regenerative aeration cycle just described. A second portion of the stream enters clarification section 22 at a relatively high velocity, the high velocity being caused by the channel effect of directors 34 and 35. This stream strikes side wall 6 and disperses. However, the force of the stream adds to the general turbulence about openings 31, 32 and 33.

Some sewage solid particles entering section 22 have air bubbles attached to them. Solids having a large number of air bubbles attached to them, or those particles normally buoyant, rise toward the top of section 22. Rising sewage solids in prior art tanks are responsible for outlet blockage. Besides the design of drain 41 described above, I have alleviated the blockage problem by use of faucet 14 and skimmer chute 37. Faucet 14 faces, and directs an air current toward, aeration section 21 through chute 37, as is best seen in FIG. 1. Faucet 14 is adapted and arranged so as to strike discharge level 51 of section 22 at an edge 54 of chute 37. The meeting of air and liquid creates a slight depression of liquid level 51 at chute 37, which depression acts to draw solids floating near upper liquid level 51 towards chute 37. As those solids draw near chute 37, they are caught by the air stream of faucet 14 and forced into aeration section 21 for recycling.

Where the sewage solids are not buoyant, they settle. Settling sewage solids in prior art tanks tend to fall back and block the opening through which they entered the clarification section. The turbulence created by the air release near opening 32 and the stream flow into opening 32 prevent this settling in the tank of my invention. Rather, the solids are forced toward interior wall 17 of side wall 6 along each side of baffle 10. As the settling solids near openings 31 and 33 in the clarification section, they are drawn back into aeration section 21 by the circulatory action of the sewage stream as that stream is channeled by directors 34 and 35.

Settling by sewage solids in section 22 is facilitated by the shape of the clarification section, best illustrated in FIG. 2. As there shown, section 22 is substantially V-shaped in cross section. The expanding nature of clarification section 22 reduces the velocity of the entering liquid stream and the suspended solids are enabled to settle and be recycled.

The tank thus described produces an acceptable, clear discharge and reduces to the point of eliminating tank failures due to sewage blockage. The turbulent nature of the liquid flow at the tank bottom prevents accumulation of solids in that area while simultaneously providing means for reintroducing settling solids into the aeration tank section. Air faucet 14 provides an uncomplicated solution to rising sewage solids and likewise provides for reintroducing the solids to the aeration section.

Numerous variations, within the scope of the appended claims, will occur to those skilled in the art in the light of the foregoing description and accompanying drawings. For example, the shape of tank 50 and baffle 10 may be varied. Although I prefer a cylindrical design, spherical or other geometrical shapes are satisfactory. Likewise, the method of support baffle 10 can be altered. Air distribution system 12 may be modified. Thus, faucet 14 and pipes 13 may be supplied from separate sources. Likewise, the design of faucet 14 may be varied. Faucet 14 may comprise addition pipe which releases air near liquid level 51 rather than the opening described in the preferred embodiment. Various other materials may be utilized in tank construction. Thus, tank 50 may be fiberglass or other structural materials, for example. Certain conventional features may be added or deleted. Some commercial embodiments of my invention eliminate sluice box 15 when additional chemical treatment of the discharged liquid is unnecessary. These variations are merely illustrative.

Having thus described the invention, what is claimed and desired to be secured by Letters Patent is:

1. A waste treatment tank having means for supplying air for carrying out an aeration process on raw sewage, which comprises:

an enclosure having an inlet for raw sewage and an outlet for removal of process waste therethrough, said enclosure including a bottom wall;

a baffle mounted in said enclosure, having a top wall and a bottom wall, dividing said enclosure angularly into two compartments, said compartments comprising a clarification section along said top baffle wall and an aeration section along said bottom baffle wall, said baffle including an upper edge, and a lower edge extending along said bottom wall of said enclosure, said lower edge having at least three, spaced, serially arranged openings in it permitting communication between said aeration and said clarification sections, two of said openings along said lower baffle edge being placed near said enclosure and the third of said openings being inboard of and spaced from said two openings, said upper baffle edge having an opening in it, said baffle preventing liquid communication between said aeration and said clarification sections along said upper edge of said baffle, except along said upper edge opening;

an aeration system adapted to supply air from said air supply means to said aeration section, arranged and carried by said bottom baffle wall so as to circulate said sewage upwardly along said bottom baffle wall;

means for removing solid waste from said clarification section, said solid waste removing means comprising an air skimmer adapted to direct a current of air through said upper edge opening in said baffle;

a first flow director mounted in said aeration section in front of one of the outboard ones of said three bottom edge openings, said first flow director having a width less than the width of said enclosure bottom wall, adapted to direct flow toward said inboard opening of said lower baffle edge, along said enclosure bottom wall; and a second flow director mounted in said aeration section in front of the other outboard ones of said three bottom edge openings near said enclosure, said second flow director having a width less than the width of said enclosure bottom wall, adapted to direct flow toward said inboard opening of said lower baffle edge, along said enclosure bottom wall.

2. The waste treatment tank of claim 1 further characterized by a third flow director mounted in said aeration section approximately 90° from each of said first and said second flow directors.

3. The waste treatment tank of claim 2 further characterized by a T-shaped drain, the cross of said T-shape having an upper surface with at least one opening therein, said drain being communicatively arranged between said clarification section and said enclosure outlet and positioned within said enclosure so as to be below the height of said outlet.

4. The waste treatment tank of claim 3 wherein said air supply means provides air to both of said aeration supply system and said solid waste removing means.

5. A waste treatment tank having means for supplying air for carrying out an aeration process on raw sewage, which comprises:

a cylindrical enclosure, said enclosure having a top wall, a bottom wall, and a side wall, said side wall having an inlet for raw sewage and an outlet for removal of process waste extending from and through said side wall, positioned near said top wall;

an elliptical baffle, mounted in said enclosure, having a top wall and a bottom wall dividing said enclosure angularly into two substantially equal volumetric compartments, said compartments comprising a clarification section along said top baffle wall and an aeration section along said bottom baffle wall, said baffle including an upper edge and a lower edge, said lower edge having at least three spaced openings in it, at least two of said openings in said lower edge lying outboard and on opposite sides of a central opening, said lower edge openings permitting communication between said aeration and said clarification sections, said upper edge having an opening in it, said baffle preventing liquid communication between said aeration and said clarification sections at said upper edge except along said upper edge opening;

means for removing solid waste from said clarification section, said solid waste removing means comprising an air skimmer adapted to direct a curtain of air through said upper edge opening in said baffle;

a first flow director mounted in said aeration section of said enclosure in front of one of said outboard openings, said first flow director having a width less than the width of said enclosure bottom wall, adapted to direct flow toward said central opening in said lower baffle edge;

a second flow director mounted in said aeration section in front of the other of said outboard openings in said bottom edge of said baffle, said second flow director having a width of less than the width of said enclosure bottom wall, adapted to direct flow toward said central opening in said lower baffle edge; and a third flow director mounted in said aeration section approximately 90° from each of said first and said second flow directors.

6. A waste treatment tank having means for supplying air for carrying out an aeration process on raw sewage, which comprises:

an enclosure including a bottom wall, said enclosure having an inlet for raw sewage and an outlet for removal of process waste therethrough;

a baffle mounted in said enclosure, having a top wall and a bottom wall, dividing said enclosure angularly into two compartments, said compartments comprising a clarification section along said top baffle wall and an aeration section along said bottom baffle wall, said baffle including an upper edge and a lower edge, said lower edge having at least three spaced openings along it, at least two of said openings in said lower edge being outboard and on opposite sides of a central opening, said upper edge having an opening in it, said upper edge of said baffle preventing liquid communication between said aeration and said clarification sections except along said upper edge opening;

an aeration supply system adapted to supply air from said air supply means to said aeration section, arranged and carried by said bottom baffle wall so as to circulate said sewage upwardly along said bottom baffle wall;

a first flow director mounted in said aeration section adapted to direct flow toward said central opening in said lower baffle edge and to retard flow into said clarification section through at least one of said outboard openings, said first flow director having a width substantially less than the width of said bottom wall of said enclosure;

a second flow director mounted in said aeration section of said enclosure adapted to direct flow toward said central opening in said lower baffle edge and to retard flow into said clarification section through at least the other one of said outboard openings, said second flow director having a width substantially less than the width of said bottom wall of said enclosure; and means for removing solid waste from said clarification section, said solid waste removing means comprising an air skimmer adapted to direct a current of air through said upper edge opening in said baffle.

7. The waste treatment tank of claim 6 wherein said baffle divides said enclosure into substantially equal volumetric compartments.

8. The waste treatment tank of claim 7 further characterized by a T-shaped drain, the cross of said T having an upper surface with at least one opening therein, said drain being communicatively arranged between said clarification section and said enclosure outlet and positioned within said enclosures so as to be below the heigth of said outlet.

9. The tank of claim 8 further characterized by a third flow director mounted in said aeration section approximately 90° from each of said first and said second flow directors.

10. The waste treatment tank of claim 9 wherein each of said flow directors are substantially rectangular in plan.

* * * * *